US006588831B1

(12) United States Patent
Ochoa

(10) Patent No.: US 6,588,831 B1
(45) Date of Patent: Jul. 8, 2003

(54) STIFFENERS FOR AUTOMOTIVE SHEET BODY STRUCTURE

(75) Inventor: Carlos M. Ochoa, 5353 Keller Springs Rd., #722, Dallas, TX (US) 75248

(73) Assignee: Carlos M. Ochoa, Plano, TX (US)

( * ) Notice: Subject to any disclaimer, the term of this patent is extended or adjusted under 35 U.S.C. 154(b) by 1 day.

(21) Appl. No.: 09/829,513

(22) Filed: Apr. 10, 2001

Related U.S. Application Data

(63) Continuation-in-part of application No. 09/707,657, filed on Nov. 7, 2000, which is a continuation-in-part of application No. 09/389,163, filed on Sep. 2, 1999, now Pat. No. 6,250,361, which is a continuation-in-part of application No. 09/263,684, filed on Mar. 5, 1999, now Pat. No. 6,082,429, which is a continuation-in-part of application No. 09/116,689, filed on Jul. 16, 1998, now Pat. No. 5,954,111.

(51) Int. Cl.$^7$ .............................................. B60R 27/00
(52) U.S. Cl. ............................................... 296/203.03
(58) Field of Search .................... 296/203.03, 187, 296/193

(56) References Cited

U.S. PATENT DOCUMENTS

| 813,175 | A | * | 2/1906 | Schaaf et al. ............... 280/800 |
| 2,841,439 | A | | 7/1958 | Schwenk |
| 3,423,122 | A | | 1/1969 | Wessells, III |
| 3,423,123 | A | | 1/1969 | Wessells, III |
| 3,455,595 | A | | 7/1969 | Wessells, III et al. |
| 3,517,765 | A | | 6/1970 | Wessells, III et al. |
| 3,541,668 | A | | 11/1970 | Wessell, III et al. |
| 3,590,936 | A | | 7/1971 | Wessells, III et al. |
| 4,234,225 | A | | 11/1980 | Harasaki et al. |
| 5,143,416 | A | * | 9/1992 | Karapetian ................. 296/209 |
| 6,398,260 | B1 | * | 6/2002 | Rinehart ..................... 296/204 |

* cited by examiner

Primary Examiner—D. Glenn Dayoan
Assistant Examiner—Lori L Coletta
(74) Attorney, Agent, or Firm—Loren G. Helmreich; Browning Bushman, P.C.

(57) ABSTRACT

A reinforcing support structure for an automotive vehicle body having a sheet structure (10) including a pair of side sheet structures (11, 12). Upper stiffener (17) and lower stiffener (18) are secured to the interior of side sheet structures (11,12). Stiffeners 17 and 18 may have a cross-sectional shape as illustrated by stiffener (39) in FIG. 6. Stiffener (39) includes a mounting flange (41) and an opposed flange (42) which have free edge portions. Beads or curls (44,46) are formed on the free edge portions for reinforcement.

40 Claims, 5 Drawing Sheets

STIFFENERS FOR AUTOMOTIVE SHEET BODY STRUCTURE

REFERENCE TO RELATED APPLICATIONS

This application is a continuation-in-part of application Ser. No. 09/707,657 filed Nov. 7, 2000; which is a continuation-in-part of application Ser. No. 09/389,163 filed Sep. 2, 1999; now U.S. Pat. No. 6,250,361, which is a continuation-in-part of application Ser. No. 09/263,684 filed Mar. 5, 1999, now U.S. Pat. No. 6,082,429 dated Jul. 4, 2000; which is a continuation-in-part of application Ser. No. 09/116,689 filed Jul. 16, 1998, now U.S. Pat. No. 5,954,111 dated Sep. 21, 1999.

FIELD OF THE INVENTION

This invention relates generally to a reinforcing support structure for an automotive vehicle body, and more particularly to stiffeners integrated with the sheet body structure.

BACKGROUND OF THE INVENTION

Stiffened sheet structures play a vital role in today's automotive body construction. To a significant degree these stiffened sheet structures serve to define the aesthetic shape and style as well as important safety elements of the vehicle. These structures have long provided an effective medium for addressing some of the unique and demanding aesthetic and structural requirements of this industry. While many technical advances have been made, improved stiffeners for automotive body sheet structures are still needed.

Over the past several years government-mandated vehicle crash test requirements as well as government and industry fuel economy and safety goals have driven the automotive industry toward lighter, stronger, more energy absorbing, and tailorable stiffeners for integration with automotive sheet material bodies, including those used in cars, trucks, minivans, and sport utility vehicles, in order to maximize structural efficiencies related to these goals. Viable candidate stiffener concepts must be capable of addressing not only performance goals, but also economies related to processing, forming, structural integration/configuration, tooling, and assembly. The automotive industry has thus embarked on an exhaustive search for simple, enabling stiffener technologies that might fulfill these requirements.

Generally speaking, even the most favored conventional stiffener technologies have satisfied only some of the combined goals, in spite of the significant advantages made possible by using the latest and most advanced technologies now available in structural simulation and stress analysis as well as in optimization computer software. These efforts have sometimes made use of very high and ultrahigh strength materials including specially developed steel alloys and extrudable aluminum alloys, as well as ceramic fiber reinforced plastics.

The most commonly resulting trend has been for weight saving and strength goals to be heroically accomplished in tandem with significant penalties in the areas of tooling, material processing, fabrication, and assembly costs. At times, form and style have yielded to functional goals. The total net cost savings has sometimes been marginal. This is because of the complex cross-sections and interfaces that are sometimes created as mass is redistributed using an increasingly intricate and localized level of control over the cross section of each structural component. As a result, fabrication, integration, complexity and space claim issues have typically risen to join a growing list of challenges.

Some of the favored cross-sections have included modified tubes, hat-shaped cross-sections, and C-channels of various types. Each of these shapes offers specific challenges in the area of interfaces and joints. Some of these shapes have been formed under very high fluid pressures that may themselves have presented new safety and training challenges in their implementation in the workplace. One common scenario in these cases has been that as design ratios of cross-sectional dimensions such as outer diameter-to-thickness or depth-to-thickness ratios exceed the range of about 50, both closed and open sections may have entered a range of relatively high sensitivity to local wall thinning during fabrication, as well as sectional buckling and reduced bending rupture resistance in service.

Furthermore, the use of thinner material in traditional open-section stiffener configurations makes these stiffened sections more susceptible to edge stress concentrations that are characteristic of open sections-especially under bending and compression loads. This is because conventional thin open sections commonly have a "blade edge". This edge is very susceptible to imperfections in the sheet material along this edge as well as to damage during manufacture, shipping/handling and installation. These imperfections along the blade edge become stress concentration points or focal points at which failure of the stiffener can initiate. A more detailed description of this failure initiation follows.

Even the most perfect, smooth edge of the conventional stiffener may experience a very localized point of high stress gradient due to the characteristic edge stress concentration associated with open sections under bending loads. Thus, initiation of an edge "bulge" or "crimp" on a perfect smooth edge is nothing more than the creation of an edge imperfection that is large enough to grow or "propagate" easily. It is significant that this stress concentration may be made worse by the presence of any relatively small local edge imperfections, even those on the order of size of the thickness of the stiffener material itself.

These imperfections near the edge can be in the form of edge notches, waviness (in-plane or out-of-plane), local thickness variations, local residual stress variations, or variations in material yield strength. Where multiple imperfections occur together, they may all compound together to further increase the stress concentration effect, and thus lower the load level at which failure is initiated. Thus, the existence of any edge imperfections in a conventional open section stiffener has the effect of enhancing an already established process of failure initiation.

Local complexity in the structural cross sectional shape of thin conventional stiffeners can further degrade structural stiffness and buckling resistance. Buckling is an instability in a part of the stiffener associated with local compressive or shear stresses. Buckling can precipitate section failure of the stiffener. This in turn can cause a stress concentration in adjacent structures that can lead to failure of a larger section. This effect is of particular concern in the evaluation of crash worthiness of automotive bodies, because such failures may be less uniform or predictable, thus making them less desirable from an occupant safety standpoint. Such unstable structures typically do not absorb sufficient crash energy or resist crash forces effectively enough to consistently meet safety performance goals without adding significant additional mass and further complexity to the overall design.

Moreover, some thinner conventional stiffeners can experience "rolling" when placed under load. Rolling is when the shear stresses within the stiffener result in a net torque about the centroid of the thin walled cross-section, thus causing the cross-section to twist, possibly making the stiffener unstable. Another cause of rolling is related to the curvature of the stiffener itself, after it has been formed to the local contour of the vehicle. Some designers have increased the cross sectional length of the open-section member flanges having free edges while attempting to solve the rolling problem but were met with only marginal improvement. This is because the increased flange length has the simultaneous effect of increasing the distance from the centroid to the shear center of the stiffener. Also, increasing the cross-sectional flange length sometimes causes difficulty in accessing the interior of the section during assembly or other operations and has typically raised additional space claim issues.

Yet another problem facing thinner conventional structural stiffeners is that of fastening or joining relatively thick sections to sections that are relatively less thick, or relatively stiff sections to sections that are relatively less stiff near the joint or interface. This can result in a local stress concentration in the region of joining. These stress concentrations may significantly weaken the joints or interfaces associated with conventional stiffeners.

Computer optimization codes often help to improve the design of conventional stiffeners. But they may not accurately represent the degradation in practical performance and increased sensitivity to geometric and material imperfections that has brought largely empirical guidelines into widespread acceptance over the years. Moreover, as conventional stiffening cross-sections are made thinner, damage tolerance may rapidly become an even greater concern. Load paths and local fastener stresses become more difficult to evaluate. Even minor repair is sometimes out of the question due to special welding or joining techniques that do not lend themselves to body shop environments. Because of ever increasing safety and performance standards, there is clearly an established need for a new and innovative automotive body structural stiffening system. The new system should combine traditional versatility and simplicity with design flexibility and tailorable structural efficiency to achieve both weight saving and crash worthiness objectives, while not casting a shadow on form and style. Such a system should specifically address and overcome the significant limitations of conventional stiffener shapes, without resorting to extreme measures, for example in fabrication or joining approaches. Such a system should largely follow existing intuitive conventions for joining and forming, handling and processing, without presenting additional obstacles to workers or to the environment.

SUMMARY OF THE INVENTION

The present invention alleviates and overcomes the above-mentioned problems and shortcomings of the present state of the art through a novel stiffener for automotive body sheet structures. The novelty and uniqueness of this invention is that it: 1) is made of thinner material to reduce the in-plane interface stresses found in the sheet interface areas, 2) resists deflection adequately to meet new higher structural stiffness requirements, 3) is resistant to buckling and rolling, 4) effectively addresses edge stress concentrations by modifying the blade edge to an area of relatively low stress, 5) provides a special interfacing flange capability that results in stronger and more crash resistant joints, 6) is synergistic with the use of thinner and stronger materials, and, 7) can be manufactured cost-effectively by using conventional forming methods such as roll forming and stretch forming.

This novel invention may be described as a substantially reconfigured or stabilized J-stiffener having a specially configured interface and mounting flange capability. It should be noted here that due to their extreme susceptibility to rolling, conventional J-stiffeners are seldom used in automotive body applications. The unexpectedly strong synergisms of the unique characteristics found in the stabilized J-stiffener not only address the above problems, but simultaneously obtain significant material savings. More particularly the synergisms may be described as follows.

The instant invention has substantially redistributed material at critical locations as compared with conventional stiffener or structural member configurations. This material redistribution has the effect of altering considerably the behavior of the stiffener as compared with conventional J-stiffeners and other stiffener configurations.

The material redistribution required to accomplish these collaborative effects is accomplished by having specifically placed free edge portions, which are turned as folds to define tubular beads or curls along the free edges. Moreover it is not just the presence of the tubular bead or curl that enables the substantial level of synergism, but the discovery of specific ratios of curl diameter to other stiffener dimensions that maximize these synergisms even to the extent of obtaining significant weight savings.

Three main sets of synergisms combine to make the present invention successful. The first set of synergisms is directly related to the ratio of the diameter of the curl to the stiffener section flange length and web length. Each tubular bead has a cross-sectional dimension which when combined in specific ratios with other stiffener dimensions substantially maximizes the moment of inertia of the overall section about the horizontal and vertical axes with a minimal use of material. Moreover, the tubular bead size specified by these same ratios has the effect of altering the characteristic failure mode normally associated with the free edge stress concentration of conventional stiffeners as described above. Not only does this substantially enhance in-service performance, but it also increases the formability of the stiffener by enabling the section to respond more uniformly during three-dimensional fabrication operations such as roll forming, pressing, or stretch-forming. Finally, the cross-sectional dimensions of the tubular beads of the stabilized J-stiffener make this novel stiffener less sensitive to edge imperfections and damage because the blade edge has now been placed in a position of relatively benign stress levels so that imperfections or damage to the tube or edge region have to be on the order of size of the diameter of the curl in order to have significant detrimental effect to the stiffener section.

Having established the above ratios, a second set of synergisms was discovered by directly combining the above with specific ratios of the stiffener's cross-sectional web dimension to cross-sectional flange dimension. The compounding effect of the first set of synergisms with this additional set of ratios makes the stabilized J-stiffener more resistant to rolling and buckling and thus avoids the problems that plague deeper conventional automotive body stiffeners using thinner gauge material. Additionally, these compounding synergisms make this stiffener unique in that stresses are now more evenly distributed in the flanges, thus making the stiffener more stable and less sensitive to dimensional imperfections. Because of these cooperative effects, the stabilized J-stiffener demonstrates its uniqueness and efficiency in using thinner gauge material to reduce in-plane stresses found in the fastener, interface, or joint areas, thus allowing the other automotive body components and the stiffener to work together as a cohesive system instead of as individual components.

The third set of synergisms relates to intermediate interface flanges of the stabilized J-stiffener. These intermediate flanges extend the capability of the J-stiffener in the following way. They permit the stabilized J-stiffener to be integrated more easily and successfully with complex arrangements of structural members, while substantially maintaining the benefits of the present invention. These intermediate interface flanges are formed according to precise and specific ranges of the angle defined between adjacent flanges, and according to specific ranges of radius-to-thickness ratios of the bend region between these flanges. The result is that the adjacent flanges to an interface flange work together to provide a significantly stabilized and strengthened interface region that lends itself to a variety of fastening or joining approaches, without substantially compromising the performance of the stiffener. In addition, when fasteners or local joints are used, an innovative barrier to crack propagation and fracture in the joint region is created. Because this innovation allows the stabilized J-stiffener to effectively address the problems of fracture and in-plane stresses at interfaces, increased performance is made possible at a larger level without significantly adding complexity and tooling costs.

Some of the mechanisms and technical advantages of better stabilization against crack growth that may originate near a bolt hole, a weld, or at other interface or joint locations along the length of the stiffener may be further described as follows. Enhanced fracture resistance is enabled by the combined effect of radius and angle between two adjacent flanges, and is still further enhanced in a compounding manner by the appropriate choice of radius to thickness ratio. This ratio serves to accomplish the dual role, first of maximizing the amount of strain hardening in the radius region which itself serves as a barrier to crack growth, and second, of emphasizing the stiffening and constraining role of one flange with respect to the other which serves as an additional crack barrier. Thus, within prescribed ranges, these variables may be changed along the length of the stiffener along with flange widths to accomplish various design goals, while substantially retaining the benefits of the teachings of the present invention. As previously stated, the dual stabilization that is achieved has a compounding effect against the growth of cracks that may originate near interfaces, joints, or welds or at other locations along the length of the stiffener. It results in a stronger, more stable stiffener that is more predictable and better able to resist damage resulting from impact for example by another vehicle. The combined effect is so significant that for some applications the strength of this unique interface flange joint may be increased by as much as a factor of about three (3).

When compared with conventional stiffeners on the market today, the stabilized J-stiffener of the present invention uses substantially thinner material while obtaining better structural performance. Thus, even though additional slit width (width of the sheet of material from which the stiffener is made) is required to reposition needed material, the use of thinner gauge material more than offsets the additional slit width, bringing overall material savings as high as 20 percent in some instances. This innovation in system configuration also represents a substantial cost savings for the manufacturer, since material cost is a significant portion of total manufacturing costs for automotive body hardware. Thus, this unique and novel stiffener is very cost effective.

For manufacturing process cost efficiency, the tubular bead is preferably an open-section bead, meaning that the sheet material is formed in an almost complete bend or curl, but the curl need not be closed at its outer edge, such as by welding. A closed section tubular bead would work equally well, at a slightly higher manufacturing cost. This edge feature is discussed in more detail in the following paragraph. The edge-flange section curl and the trough curl are folded tubular features, preferably open-sections, that are made by shaping the free edges or edge marginal portions of the stiffener cross-sections into a generally elliptical, preferably circular, cross-sectional shape. As used herein, a circular cross-section is an embodiment of an elliptical crosssection and is covered by the term "elliptical cross-section" or "elliptical cross-sectional shape". The term "characteristic diameter" refers to a constant diameter in the case of a circle, while other elliptical shapes will have major and minor axes or diameters, with the minor axis or diameter being the "characteristic diameter".

Even though some configurations of a slightly non-circular elliptical shape may be more desirable in some applications, the circular cross section embodiment is generally preferable, because it is simpler to manufacture, while still achieving the desired benefits to a significant degree.

It is important to contrast the edge curl approach against other possible edge treatment approaches by noting that the dimensional order of size effect related to imperfections or damages described above for the curl can not be achieved by simply folding the edge over, either once or multiple times, because in this case the characteristic dimension will be defined by the fold edge diameter and not by the length of overlap of the fold. This is because the overlap direction is transverse to the edge and quickly moves out of the peak stress region, and because the edge fold diameter defines the maximum distance over which the edge stresses may be effectively spread.

The elliptical or circular open-section tubular shape or "edge curl" is contrasted to tubular sections of rectangular cross-sectional shapes, including folded edges, and to open-section tubular shapes of softened corner polygon cross-sectional shapes in that the characteristic diameter will be defined in each of these other cases by the fold diameter or by the softened corner diameter nearest to the stiffener edge, as opposed to the overall diameter of the edge curl section. It may be noted that in this context a polygon cross-section with very softened corners is in effect an imperfect ellipse or circle.

In some instances, quasi-elliptical or quasi-circular cross-sections, teardrops, imperfect ellipses, and imperfect circles, in the form of polygons or rectangular cross-sections with some rounded regions may function adequately, but may also be more difficult to manufacture and may be less effective than a generally circular curl. Including local offsets or adding material locally such as by bonding or welding strips of material or high strength fibers or wires are additional examples. Yet other examples include local modifications to the material such as by heat, electromagnetic, chemical, or deformation treatment of the tubular bead cross-section or of adjacent regions. In spite of the potential for additional fabrication costs, some of the above variations may at times be desirable for example in local regions where the designer desires local regions of modified cross-sectional shape for space claim, interfacing, or joining reasons, or in special cases where such features may be combined with other features such as notches, folds, or hole patterns near the edge region in order to induce a prescribed response of the stiffener, such as in addressing crash energy absorption design-related goals. In some applications the curl may be formed by turning the edges through an arc of up to 360 degrees, 720 degrees, or even more, so that the edge loops over one or more times on itself, in order to concentrate mass locally or to address other design objectives. In these cases manufacturing economy and complexity are also considerations.

Some of the substantial advantages made possible through the teachings of the present invention may be summarized as follows. They include the synergistic effect of the stabilized J-stiffener's material efficiency in obtaining the desired bending rigidity or moment of inertia, the alteration of the characteristic failure mode, the reduction in sensitivity to edge imperfections and damage, higher fracture resistance and more stable stresses in the regions of joints and interfaces, resistance to buckling and rolling, as well as the ability to spread stresses more uniformly. These features offer the same degree of compounding advantage as the conventional stiffener's compounding disadvantage of low resistance to buckling and rolling combined with sensitivity to relatively small edge or dimensional imperfections. Accordingly, it can now be appreciated by those versed in this art, that the novel stabilized J-stiffener of the instant invention provides a solution to some important problems that the stiffened sheet material automotive body art has sought to overcome.

In summary, the stabilized J-stiffeners of the present invention, having specially configured interface capabilities including mounting flanges that are uniquely designed to be compatible with substantially all types of standard sheet material automotive body structures, are thereby significantly capable of lowering costs and reducing the number of stiffener types that designers must consider to achieve their objectives. These novel stiffeners thus permit more stringent structural and safety requirements to be addressed. Since they are quite adaptable, they often permit this to be done without major modification of other hardware.

The description of the present invention may incorporate dimensions that are representative of the dimensions which will be appropriate for some common automotive applications. Recitation of these dimensions is not intended to be limiting, except to the extent that the dimensions reflect relative ratios between the sizes of various elements of the invention, as will be explained where appropriate.

It is an object of the invention to provide stiffeners for an automotive sheet structure and particularly to a provide and effective stiffener for an automotive side sheet.

It is a further object to provide an economical stiffener that is capable of extending in a longitudinal direction for substantially the entire length of an automotive vehicle.

Another object is the provision of a stiffener for an automotive side sheet structure in which the stiffener has a pair of flanges with free edges and a tubular bead extending along the free edge of each flange for reinforcing the stiffener.

DESCRIPTION OF THE INVENTION

Figure 2:
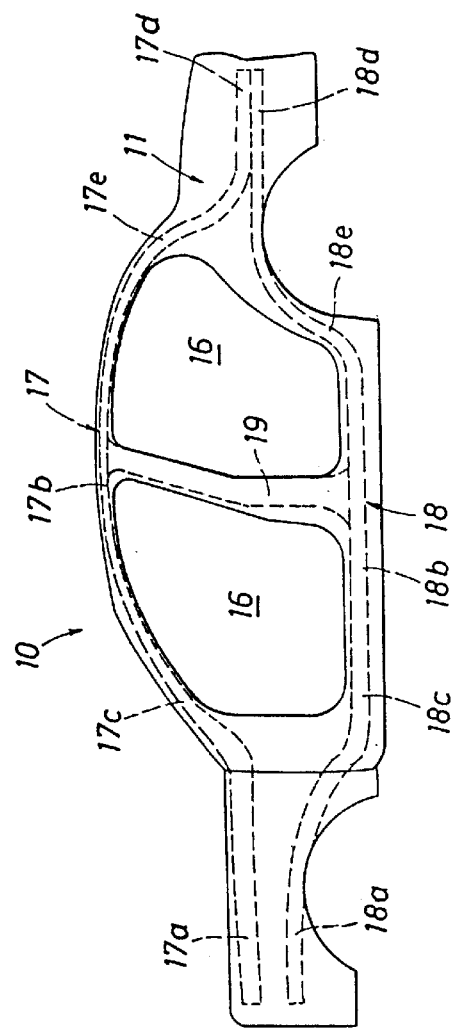
FIG. 2 is a side elevation of the upper and lower stiffeners shown in FIG. 1 extending horizontally for substantially the entire length of the automotive body.
Figure 1:
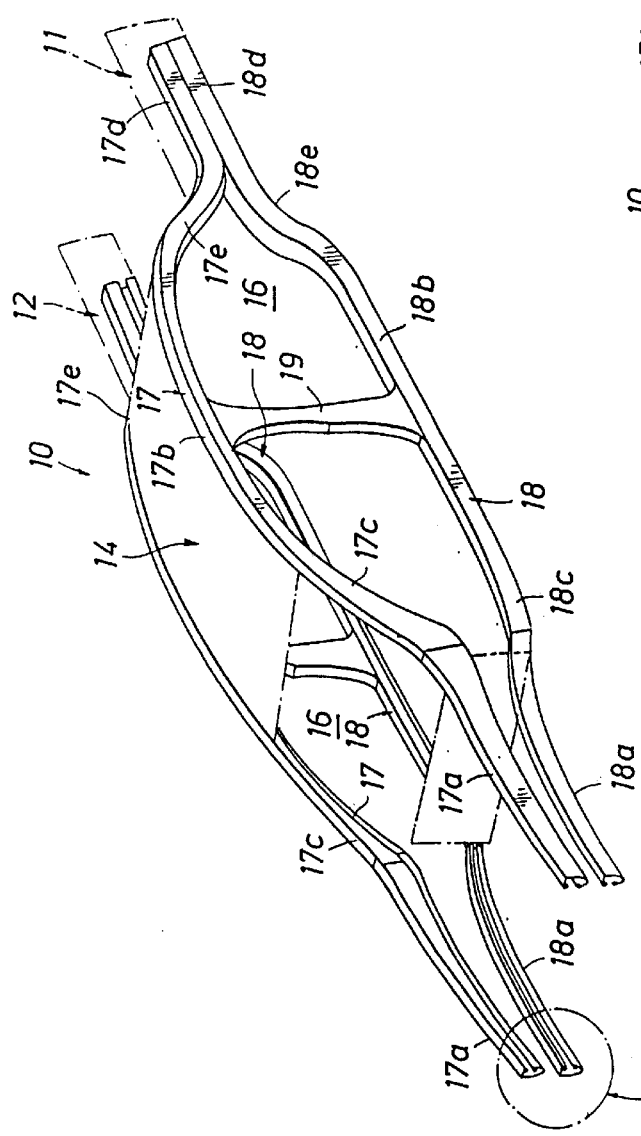
FIG. 1 is a perspective of an automotive sheet structure body including side sheets having stiffeners comprising the present invention mounted thereon.

Referring now to the drawings for a better understanding of the present invention, and more particularly FIGS. 1 and 2, an automotive body sheet structure is shown generally at 10 and includes side sheet structures generally indicated 11 and 12 connected by a roof panel 14. Door openings are shown at 16. For reinforcing side sheet structures 11 and 12, elongate upper and lower sheet reinforcing members or stiffeners generally indicated at 17 and 18 respectively extend continuously for substantially the entire length of body sheet structure 10 and are mounted on the inner surface of side sheet structures 11 and 12. Sheet reinforcing members 17 and 18 comprise stiffeners of the present invention upper reinforcing structure 17 includes a front end portion 17a, a roof portion or rail 17b, a front curved portion 17c, a rear end portion 17a, a roof portion or rail 17b, a front curved connection portion 17c, a read end portion 17d, and a rear curved connection portion 17e between roof portion 17d. Lower sheet reinforcing structure 18 includes a front end portion 18a, an intermediate base portion 18b, a front connection portion 18c, a rear end portion 18d, and a rear curved connection portion 18e. A vertical post or pillar 19 extends between door openings 16 and upper and lower sheet reinforcing structures 17 and 18. Sheet enforcing structures 17 and 18 are normally in spaced relation to each other except for rear end portions 17d and 18d which may be bolted or welded to each other. Upper and lower sheet reinforcing structures 17 and 18 are of a generally similar cross-section although a relatively small variation in dimensions or shape may occur along the length of sheet reinforcing structures 17 and 18.

Figure 3:
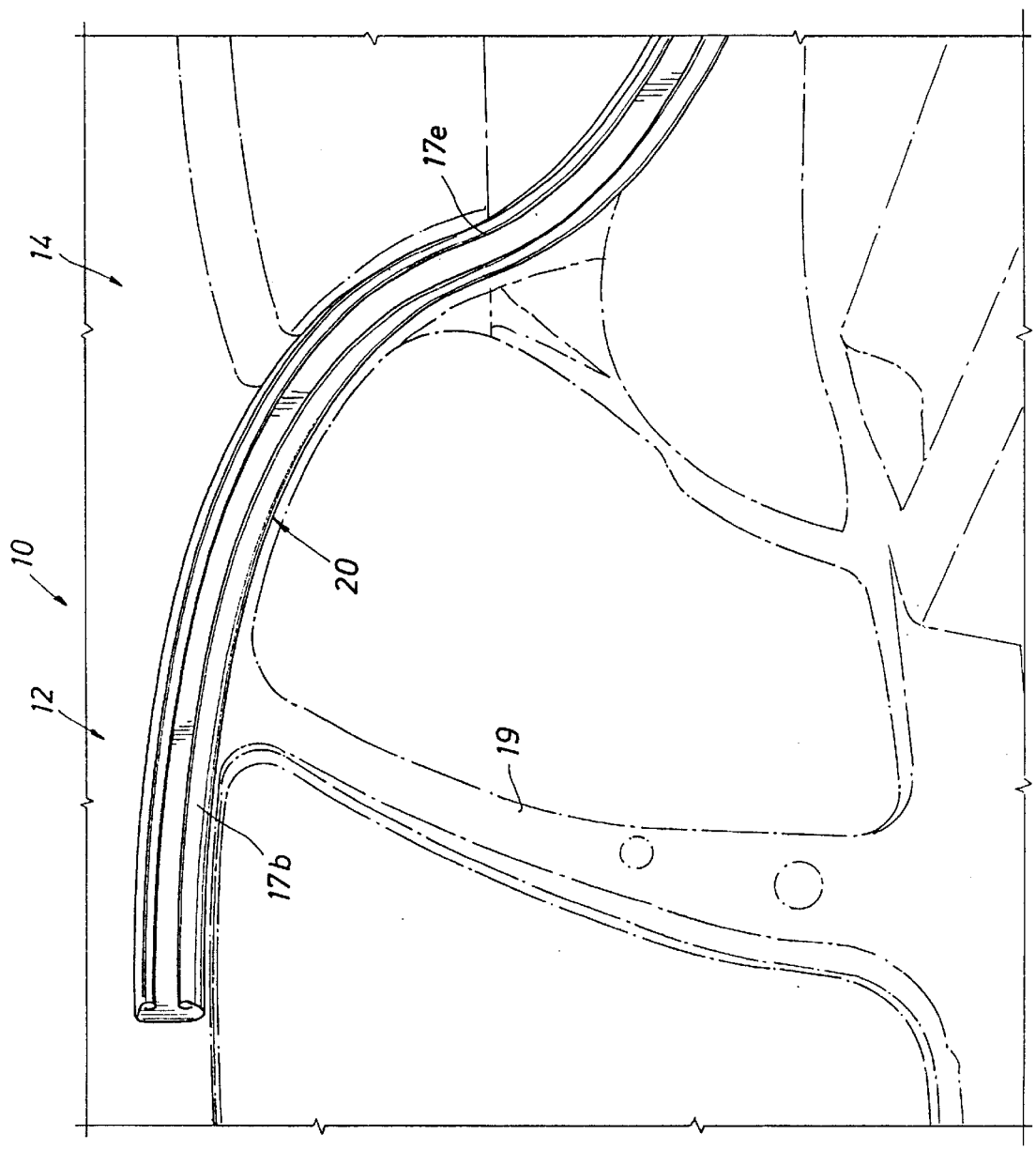
FIG. 3 is a perspective of an automotive sheet material body interior showing a roof portion and integral rear end portion of the upper stiffener shown in FIGS. 1 and 2 mounted on an automotive side sheet.
Figure 4:
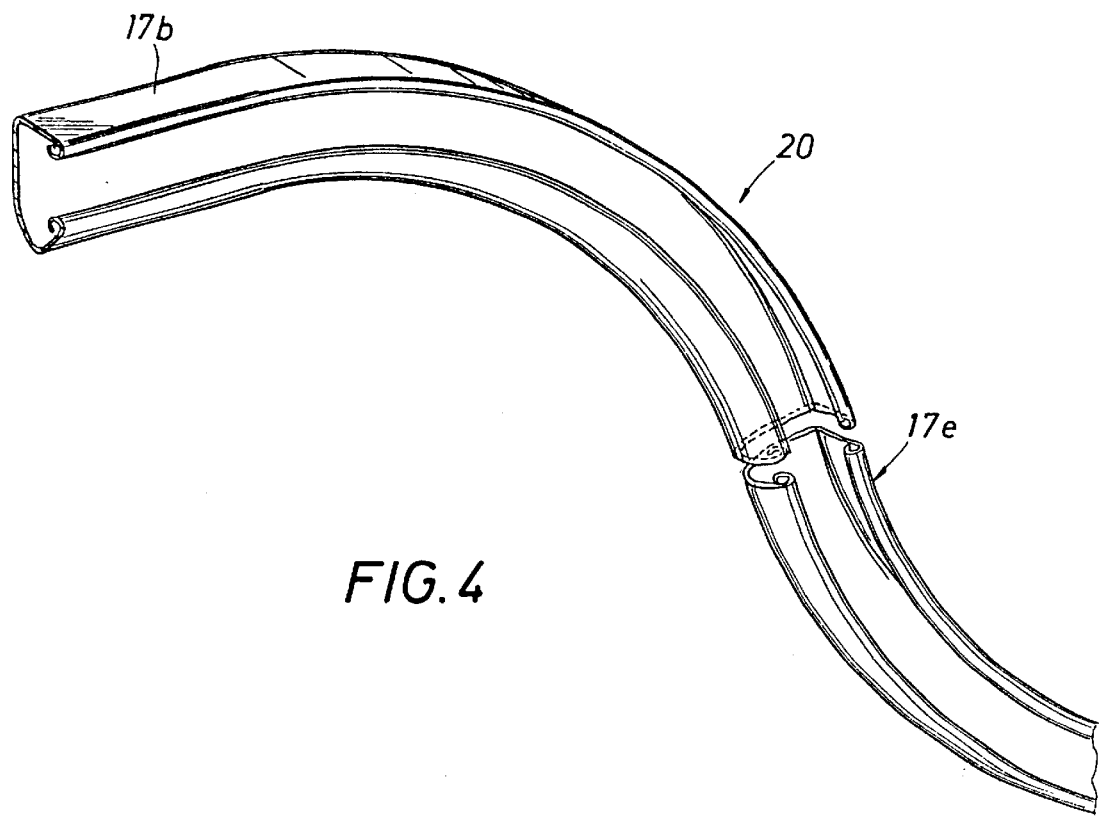
FIG. 4 is a perspective of the stiffener shown in FIG. 3 removed from the side sheet structure.
Figure 5:
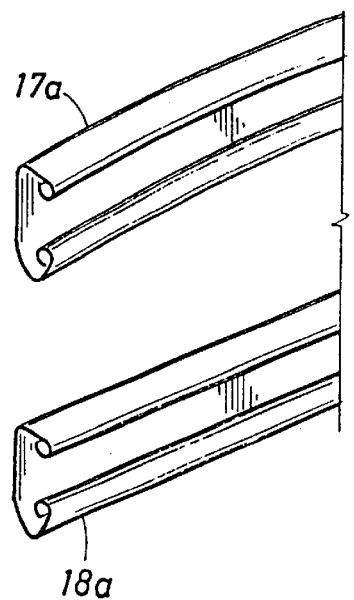
FIG. 5 is a perspective of the front end portion of the upper and lowerstiffeners.

As an example and referring to FIGS. 3 and 4, a suitable stiffener portion is illustrated generally at 20 for roof portion 17b and rear curved connecting portion 17e. Stiffener portion 20 is effective to withstand bending loads near the mid-span of roof portion 17b and is also stable against axial loads introduced near the lower end of rear connecting portion 17e. FIG. 4 shows stiffener portion 20 removed from the automotive body sheet structure. It may be noted that the cross-section of stiffener portion 20 may vary slightly since the stiffener portion may be required to conform to the curvatures of the vehicle body. This may be accomplished through relatively simple stretch-forming operations that may be performed subsequent to roll-forming the cross-sectional shape.

One shape that has recently gained interest in the industry because of the shortcomings of conventional open section stiffeners has been hydroformed tubes. Comparison of the present invention to hydroformed tubes is used in order to highlight the novel capabilities introduced by the present invention. Hydroformed tubes are typically made from thin, high strength steel. These tubes are susceptible to local damage during fabrication and handling that may precipitate buckling of the tube cross-section. Furthermore, their attachment to the vehicle body along the length of the tube is not easily accomplished because access is a problem. Finally, in some cases it may be possible that damage is present in an installed tube, but that the damage cannot be observed by inspectors subsequent to installation, because some of the tube is hidden from view once it is installed. In contrast, the stiffeners of the present invention are open sections, and thus provide greater ease in inspecting the integrity of installed parts.

The actual process of fabricating hydroformed tubes can involve sensitive steps of precise three-dimensional stretch-forming during which it may be difficult to uniformly grip and load the part in order to maintain a uniform cross-section and prevent local thinning of the tube wall. This may limit the length of tube that may realistically be considered. Longer tubes may quickly rise in cost because these complexities increase greatly with total tube length. Moreover, high pressure forming is also used, during which additional local wall-thinning may occur. Wall thinning is an important concern for hydroformed tubes because it may not be detectible through simple visual inspection. In contrast, the stiffeners of the present invention typically deform in a more uniform fashion because the tubular edges promote uniformity in stresses that aids in achieving consistent and uniform parts without requiring special inspection techniques. The stiffeners of the present invention lend themselves to "section-by-section" forming operations. This enables long stiffeners of complex shapes to be formed relatively simply, and at lower cost.

During installation, the hydroformed tubes may require special care in order to secure them and join them to the sheet structure at either end so that they are able to maintain their structural integrity under axial loads. This can be a formidable task because access between the tube and the sheet is restricted. In contrast, the flanges of the present invention lend themselves to a variety of joining techniques because of easy access and reduced sensitivity to nonuniformity at the joints due to the special tubular edge features and the special interface flange geometries that stabilize the joints.

Sheet structure 10 is commonly formed from one or several thin sheets of high strength and modulus materials such as steel or aluminum, although fiber reinforced plastics or metals may also be used. When multiple sub-sheets are used, they may be formed independently and then joined together such as by bonding or welding, to extend sheet structure 10. The overall industry trend for automotive body structures is to form sheet structure 10 from as few sub-sheets as possible in order to maximize the rigidity, strength and structural integrity of sheet structure 10. This is important because of the vital role that sheet structure 10 plays in maintaining the vehicle body shape and stiffness thereby reducing vibration, as well as in maintaining body strength and integrity during a vehicle crash or rollover. Sheet structure 10 must also absorb energy and protect the vehicle occupants from intrusion into the vehicle interior compartment during a crash. Because sheet structures typically have little inherent bending stiffness of their own, they largely depend upon stiffening members to integrate with them for support. These stiffeners are thus vital to each of the various roles of sheet structure 10. The functions of the reinforcing structures or stiffeners 17 and 19 that interface with sheet structure 10 provide load paths in areas where the body is attached to the vehicle frame (not shown) for transferring loads between the vehicle frame and the sheet structure 10 of the vehicle body.

In order to further highlight the novelty and significance of the present invention, specific stiffener embodiments are chosen related to stiffeners that are interfaced with sheet structure 10. The following highlights the stiffeners of the present invention in terms of their ability to address and substantially overcome many of the difficulties related to stiffeners presently in use. It also highlights the unique combination of local flexibility in the use of thin material, along with the substantial rigidity that is accomplished in the overall sheet structure. In this discussion, some unique interface features will be discussed that further maximize the structural and cost efficiency that is achievable in implementing the present invention. Those versed in the art will readily recognize the simplicity and versatility of the modified J-stiffeners of the present invention in reducing fabrication costs and in enabling the automotive designer to simultaneously and synergistically achieve a variety of design objectives related to fabrication, performance, safety, interfaces, and aesthetics.

Figure 6:
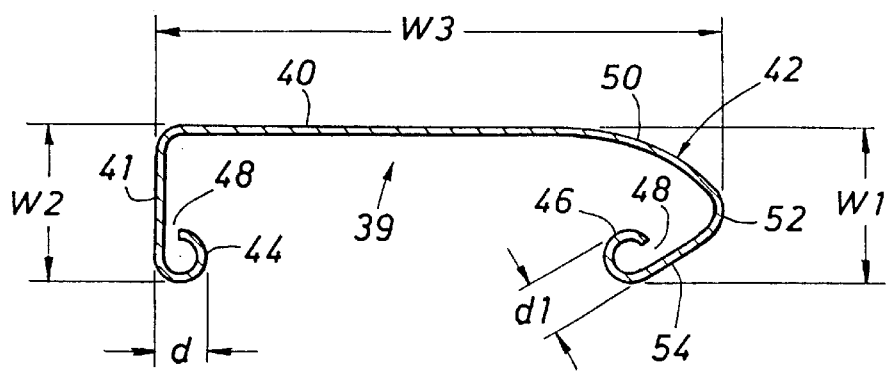
FIG. 6 is an enlarged section of a stiffener removed from a body section.
Figure 7:
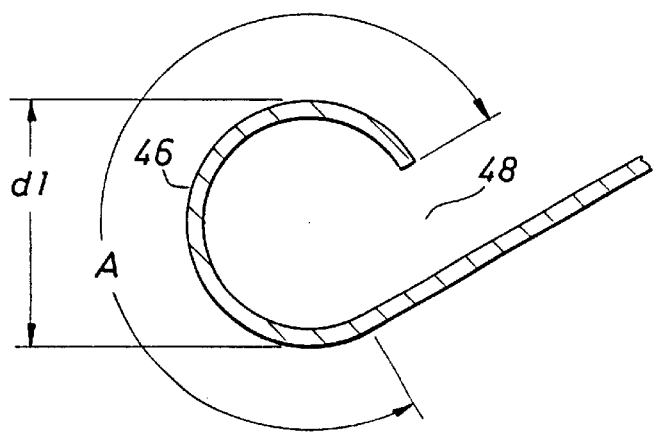
FIG. 7 is an enlarged sectional view of a bead on a free end of the stiffener.

To illustrate a typical cross-section for stiffeners 17, 18, a stiffener such as stiffener 39 which includes the features shown in FIG. 6 has been found to be satisfactory for the entire length of reinforcing structures 17,18 generally with only changes in dimensions being required for different length portions. Stiffener 39 is commonly formed of a sheet material such as a steel alloy or a fiber reinforced material, and comprises a web or body 40, an integral mounting flange 41 at right angles to body 40, and an integral outer bowed flange 42. The opposed free edge portions of mounting flange 41 and bowed flange 42 are turned inwardly to form open-section tubular beads or edge curls 44,46. An open gap 48 as shown also in FIG. 7 is formed adjacent each tubular bead 44,46. Tubular beads 44, 46 are shown as being of circular configurations or shapes in cross section and have outer diameters indicated at d and d1. Tubular beads 44,46 are turned inwardly an angular amount A of about 270 degrees from the flange 41 and bowed flange 42 as shown in FIGS. 6 and 7 particularly. Thus, gap 48 is of an angular amount about 90 degrees. If desired, tubular beads 44, 46 could be closed although 270 degrees has been found to be optimum. An angular or circular shape for beads 44,46 as small as about 210 degrees would function in a satisfactory manner in most instances.

While a circular shape for tubular beads 44,46 is preferred, a generally elliptical non-circular shape would function adequately in most instances. A tubular bead or curl of a non-circular elliptical shape has a major axis and a minor axis. Diameter or dimension d or d1 for an elliptical shape is interpreted herein for all purposes as the average dimension between the major axis and the minor axis. The major and minor axes are at right angles to each other and are defined as the major and minor dimensions of the open or closed tubular section. To provide an effective elliptical shape for tubular beads 44 and 46, the length of the minor axis should be at least about 40 percent of the length of the major axis. The terms "elliptical" shape and "elliptical" cross section are to be interpreted herein for all purposes as including circular embodiments. For a circular embodiment diameters d and d1 may be equal in order to simplify manufacturing operations. Preferably, diameter d1 for bead 46 is larger than diameter d for bead 44 in a non-circular elliptical shape. Bowed flange 42 is generally bowl shaped and has a sloping wall portion 50 extending from body 40 to an arcuate apex 52. An integral sloping wall portion 54 extends from arcuate apex 52 to bead 46.

In order for tubular beads 44, 46 to provide maximum strength with a minimal cross sectional area of stiffener 39, the diameter d1 of tubular bead 46 is selected according to the width W1 of bowed flange 42 as shown in FIG. 6.

A ratio of about 5 to 1 between W1 and d1 has been found to provide optimum results. A ratio of W1 to d1 of between about 3 to 1 and 8 to 1 would provide satisfactory results. A similar ratio between W2 and d for tubular bead 44 is utilized. As an example of a suitable stiffener 39, W1 is 1 inch, W2 is 1 inch, and W3 is 3½ inches. The diameter d for bead 44 is 3/16 inch and diameter d1 for bead 46 is ¼ inch.

In order to obtain the desired minimal weight stiffener, tubular curls or beads 44, 46 must be shaped and formed within precise ranges and sizes in order to provide maximum strength. Using various design formulae to determine the outer diameters of tubular curls 44, 46, an optimum outer diameter of ¼ inch was found to be satisfactory. However, it is preferred that diameter d1 for curl 46 be slightly larger than diameter d for curl 44. W1 and W2 are at least two (2) times and preferably between about three (3) and five (5) times the outer diameter of tubular curls 44, 46 for best results. Width W3 is between about two (2) and seven (7) times widths W1 and W2 for best results. By providing such a relationship between tubular curls 44, 46 and widths W1 and W2 the moment of inertia is maximized and edge stress concentrations are minimized for stiffener 39 thereby permitting the light weight construction for stiffener 39 of the present invention. Tubular curls 44, 46 are illustrated as turned inwardly which is the most desirable. In some instances it may be desirable to have a tubular curl turned outwardly.

For mounting stiffeners 17,18 with body sheet structure 10 as shown particularly in FIGS. 1–3, mounting flange 41 may be modified locally in order to accommodate attachment with the adjacent sheet structure. This may include removing a segment of the tubular edge, or simply modifying its shape such as by flattening it locally to accommodate joining in order to obtain a more rigid and integrated structural support of the sheet structure body.

The following example will further highlight the novelty and utility of stiffener 39. When the typical cross-section of stiffener 39 is utilized for front end portions 17a and 18a, the continuous stiffeners 17,18 provide a load path and substantial integrated stiffening and strengthening of large sections of body side outer sheet structure 10. This is accomplished with maximum simplicity and a minimum number of critical joints. In some locations continuous welding may not be required to adequately mount a stiffener on body side outer sheet 10, and may be replaced by skip or spot welding. This is enabled by the stabilized edges of the stiffener that cause the loads to distribute more uniformly into the interior of the stiffener cross section. Additional stiffeners such as shown at 39 or 39A may be mounted at various angles on body side outer sheet structure 10 in order to enhance the overall structural performance of the vehicle body, or to achieve other design objectives. These may be interfaced with each other, and may even be extended such as to form large closed loops over the body side structure 10, for example, in order to maximize structural efficiency in achieving stability and resistance of the automotive body to intrusion during a crash or vehicle rollover.

As a specific example of a typical stiffener 39 being utilized for stiffener 17 such as roof portion 17b secured to body outer sheet structure 10, roof portion 17b may have a thickness of 19 gauge (0.047 inch) with W1 and W2 being 1.25 inch and W3 being 2¾ inches. Diameter d is ⅜ inch and diameter d1 is ⅜ inch. When stiffener 39 is utilized for front end portion 17a of sheet reinforcing member 17, front end portion 17a may have a thickness of 16 gauge (0.063 inch) with W1 and W2 each being about 2¼ inches. Diameter d may be chosen as ⅜ inch and diameter d1 may be chosen as ⅜ inch. High strength steel is normally used to enhance the strength and crash worthiness of stiffeners 17,18. However, certain fiber reinforced composite materials have been found to be satisfactory.

Figure 8:
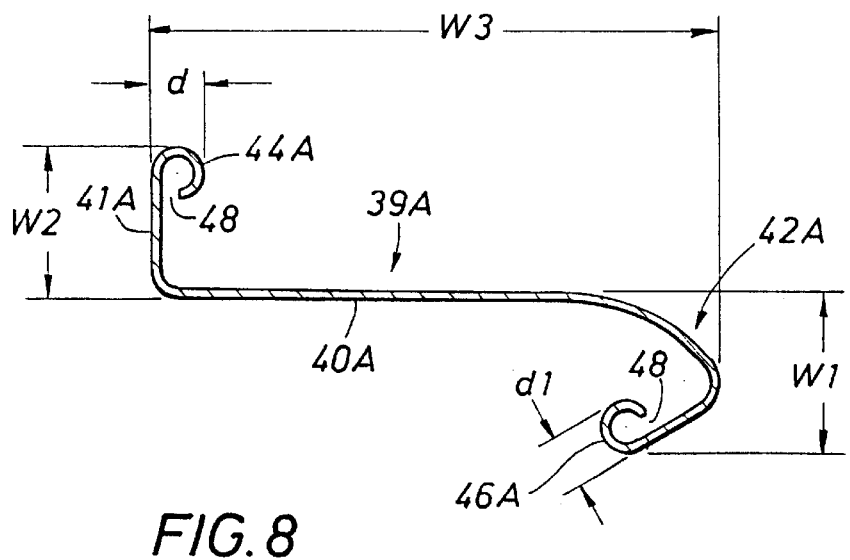
FIG. 8 is an enlarged section of a modified stiffener in which the mounting flange extends in an opposite direction from the mounting flange for the embodiment of FIG. 6.

FIG. 8 shows another embodiment of an automotive body stiffener in which stiffener 39A has a mounting flange 41A extending from body 40A generally in the opposite direction as outer bowed flange 42A. Tubular curls or beads 44A and 46A together with the dimensions shown at W1, W2, W3, d, and d1 are similar to the embodiment of FIGS. 1–7. The only change in the embodiment of FIG. 8 from the embodiment of FIGS. 1–7 is the direction in which mounting flange 41A extends.

Figure 7A:
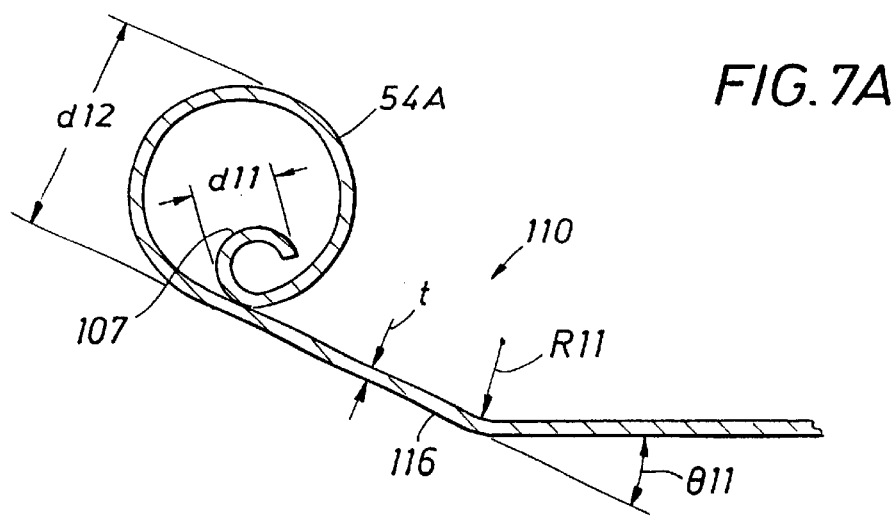
FIGS. 7A and 7B are enlarged sectional views of modified beads on a free end of a stiffener.
Figure 7B:
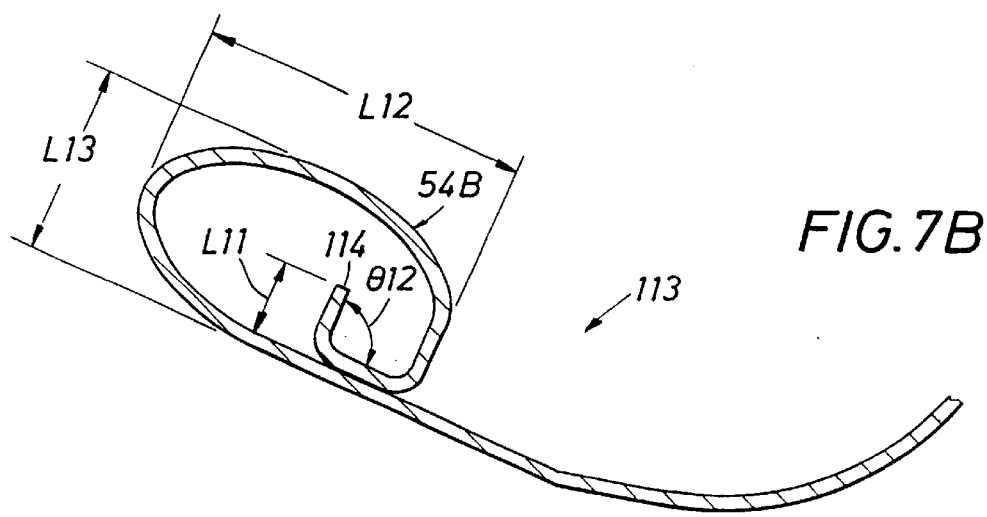

FIGS. 7A and 7B show two embodiments of alternative tubular edge features to that of FIG. 7. Each of these two embodiments is directed to a bead or curl in E which the outer diameter to thickness ratio of the tubular edge is larger than about 15. In these cases, additional stiffening of the tubular edge may be desired. As shown in embodiment 110 a smaller elliptical curl 107 inside the tubular edge feature or large diameter curl 54A is shown in FIG. 7A, and includes a "curl flange" 116 with associated thickness t, radius R11 and angle θ11 in order to further stabilize tubular edge 54A. For ratios of radius R11 to thickness t of 3.5 or less, and for angle θ11 at least about 25 degrees in the positive or negative direction, a special strengthening effect is obtained which causes the curl flange 116 to act together with tubular edge 54A so that the entire edge is substantially strengthened against deformation such as may occur during a vehicle crash. This added stabilization is thus a very useful extension of the capabilities of the present invention.

As an alternative to the curl within a curl of FIG. 7A, FIG. 7B shows embodiment 113 having a lip 114 of length L11 that may be applied to the free edge of the curl 54B such as is shown in FIG. 7B. In this case the angle θ12 is between 30 and 120 degrees for best results, and the length L11 of lip 114 is between ⅕ and ⅘ of the average of edge tube dimensions L12 and L13 for best results. Longer lips may be used, but usually with limited additional benefits over the benefits of the range given.

Figure 9:
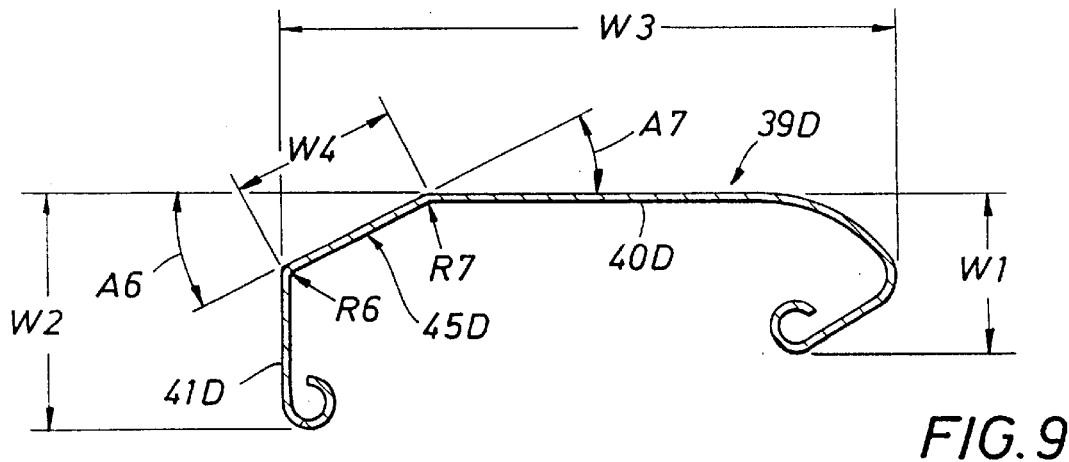
FIG. 9 is an enlarged section of a modified stiffener in which an intermediate interface flange extends from the mounting flange at an angle and interfaces the next adjacent flange at an angle.

Referring now to FIG. 9, a separate embodiment of a stiffener 39D is illustrated which is similar to stiffener 39 shown in FIG. 6 except for an intermediate connecting flange portion 45D extending between mounting flange 41D and body or web 40D. Connecting flange portion 45D extends at an angle A6 and radius R6 with respect to mounting flange 41D and at an angle A7 and radius R7 with respect to body 40D. Connecting flange portion 45D is of a width W4. Radius R6 and radius R7 are each less than 3.5 times the thickness of stiffener 39D for best results. Angle A6 and angle A7 are each preferably at least greater than about 25 degrees in a positive or negative direction. Dimensions W1, W2, and W3 are similar to dimensions W1, W2, and W3 shown in FIG. 6. The length of W4 is generally smaller than the length of W3 for best results.

While stiffeners or sheet reinforcing members 17 and 18 have been illustrated as extending continuously for substantially the entire length of the automotive body, it may be desirable in some instances to utilize only a portion of the length of stiffeners 17,18. For example, front end portions 17a and 18a may in some instances be separated from the remainder of stiffeners 17 and 18. The specific longitudinal shape of stiffeners 17 and 18 may also vary depending primarily on the shape of the automotive body and side sheet construction.

As a result of providing the inturned tubular beads or curls along the marginal edge portions of the stiffener, an unexpected significantly thinner gauge material generally about twenty percent lighter has been utilized for the stiffener as compared with conventional prior art body stiffeners as utilized heretofore. By utilizing precise tubular beads as set forth herein on the selected members where it is most needed for strength, a manufacturer may utilize an unexpected substantially thinner gauge material while eliminating or minimizing problems encountered heretofore by prior art designs of stiffeners for the sheet structures of automotive bodies.

While the particular invention as herein shown and disclosed in detail is fully capable of obtaining the objects and providing the advantages hereinbefore stated, it is understood that this disclosure is merely illustrative of the presently preferred embodiments of the invention and that no limitations are intended other than as described in the appended claims.

What is claimed is:

1. An automotive sheet body structure comprising:
   a side sheet member having an inner surface and an outer surface;
   an elongate stiffener secured to said inner surface of said side sheet member, said stiffener defining in cross-section a web and a flange extending outwardly from each end of said web, each of the flanges having a free edge; and
   a tubular bead extending along the free edge of each flange for reinforcing said stiffener, the tubular bead being inturned and of an elliptical cross-section wherein the minor axis is at least about 40 percent of the major axis.

2. The automotive sheet body structure as defined in claim 1, wherein one of said flanges extends at right angles to said web to define a mounting flange, and the other of said flanges is a bowed flange.

3. The automotive sheet body structure as defined in claim 2, wherein the width of said bowed flange and said mounting flange is at least about two times the outer diameter of said beads.

4. The automotive sheet body structure as defined in claim 3, wherein said inturned tubular beads are of a circular cross-section and extend in a circular path of at least about 210 degrees.

5. The automotive sheet body structure as defined in claim 2, wherein said web has a width between two times and seven time the width of said bowed flange and the width of said mounting flange.

6. The automotive sheet body structure as defined in claim 1, wherein each bead has a closed end to define an enclosed area; and a curled end portion of said bead extends within said enclosed area from said closed end to provide additional reinforcing.

7. The automotive sheet body structure as defined in claim 6, wherein said curled end portion is of an elliptical cross section.

8. The automotive sheet body structure as defined in claim 6, wherein said curled end portion includes a planar flange extending within said enclosed area.

9. The automotive sheet body structure as defined in claim 1, further comprising an intermediate connecting section between said web and one of said flanges, said connecting section extending from said web at an angle of at least about 25 degrees.

10. An automotive sheet body structure as defined in claim 1, wherein said elongate stiffener comprises an upper stiffener extending continuously for substantially the entire length of said side sheet member.

11. An automotive sheet body structure as defined in claim 10, wherein said elongate stiffener includes a front end portion, a roof portion, a rear end portion, and connecting portions between said roof portion and said front and rear end portions.

12. An automotive sheet body structure comprising:
    a side sheet member having an inner surface and an outer surface;
    an upper stiffener secured to said inner surface of said side sheet member;
    a lower stiffener secured to said inner surface of said side sheet member;
    each stiffener defining in cross-section a web and a flange extending outwardly from each end of said web, each of the flanges having a free edge;
    a tubular bead extending along the free edge of each flange for reinforcing said stiffener; and
    each of said tubular beads being inturned and of an elliptical cross-section.

13. The automotive sheet body structure as defined in claim 12, further comprising:
    a door opening between said upper and lower stiffeners;
    each stiffener extending for substantially the entire length of the sheet body structure and including a front end portion, an intermediate portion, a rear end portion, and connecting portions between said intermediate portion and said front and rear end portions.

14. The automotive sheet body structure as defined in claim 12, wherein the minor axis of the elliptical cross-section is at least about 40 percent of the major axis.

15. The automotive sheet body structure as defined in claim 14, wherein one of said flanges extends at right angles to said web to define a mounting flange, and the other of said flanges is a bowed flange.

16. The automotive sheet body structure as defined in claim 15, wherein the width of said bowed flange and said mounting flange is at least about two times the outer diameter of said tubular beads.

17. The automotive sheet body structure as defined in claim 15, wherein said web has a width between two times and seven times the width of said bowed flange and the width of said mounting flange.

18. An automotive sheet body structure comprising:
    a front side sheet member having an inner surface and an outer surface;
    an upper front end stiffener secured to said inner surface of said front side sheet member;
    a lower front end stiffener secured to said inner surface of said front side sheet member and aligned vertically with said upper front end stiffener;
    each stiffener defining in cross-section a web and a flange extending outwardly from each end of said web, each of the flanges having a free edge; and
    a tubular bead extending along the free edge of each flange for reinforcing said stiffener, the tubular beads being inturned and of an elliptical cross-section wherein the minor axis is at least about 40 percent of the major axis.

19. The automotive sheet body structure as defined in claim 18, wherein one of said flanges extends at right angles to said web to define a mounting flange, and the other of said flanges is a bowed flange.

20. The automotive sheet body structure as defined in claim 19, wherein said web has a width between two times and seven times the width of said bowed flange and the width of said mounting flange.

21. An automotive sheet body structure comprising:
- a side sheet member having an inner surface and an outer surface;
- an elongate stiffener secured to said inner surface of said side sheet member, said stiffener defining in cross-section a web and a flange extending outwardly from each end of said web, each of the flanges having a free edge;
- a tubular bead extending along the free edge of each flange for reinforcing said stiffener; and
- one of said flanges extending from said web to define a mounting flange, and the other of said flanges is a bowed flange.

22. The automotive sheet body structure as defined in claim 21, wherein the width of said bowed flange and said mounting flange is at least about two times the outer diameter of said beads.

23. The automotive sheet body structure as defined in claim 22, wherein said inturned tubular beads are of a circular cross-section and extend in a circular path of at least about 210 degrees.

24. The automotive sheet body structure as defined in claim 21, wherein said web has a width between two times and seven times the width of said bowed flange and the width of said mounting flange.

25. An automotive sheet body structure as defined in claim 21, wherein said elongate stiffener comprises an upper stiffener extending continuously for substantially the entire length of said sheet body construction.

26. An automotive sheet body structure as defined in claim 25, wherein said elongate stiffener includes a front end portion, a roof portion, a rear end portion, and connecting portions between said roof portion and said end portions.

27. An automotive sheet body structure, comprising:
- a side sheet member having an inner surface and an outer surface;
- an upper stiffener secured to said inner surface of said side sheet member;
- a lower stiffener secured to said inner surface of said side sheet member;
- a door opening between said upper and lower stiffeners;
- each stiffener defining in cross-section a web and a flange extending outwardly from each end of said web, each of said flanges having a free edge; and
- a tubular bead extending along the free edge of at least one said flange for reinforcing each said stiffener, said tubular bead being inturned and of an elliptical cross-section.

28. An automotive sheet body structure as defined in claim 27, further comprising:
- at least one of said stiffeners extending for substantially the entire length of the body structure including a front end portion, an intermediate portion, a rear end portion, and connection portions between said intermediate portion and said front and rear end portions.

29. An automotive sheet body structure as defined in claim 27, wherein each of said upper and lower stiffeners include a front end portion.

30. The automotive sheet body structure as defined in claim 27, wherein the minor axis of the elliptical cross-section is at least about 40 percent of the major axis.

31. The automotive sheet body structure as defined in claim 27, wherein one of said flanges extends at right angles to said web to define a mounting flange, and the other of said flanges is a bowed flange.

32. The automotive sheet body structure as defined in claim 27, wherein each bead has a closed end to define an enclosed area, and a curled end portion of said bead extends within said enclosed area from said closed end to provide additional reinforcing.

33. An automotive sheet body structure as defined in claim 27, wherein said upper stiffener extends continuously for substantially the entire length of said sheet body structure.

34. An automotive sheet body structure as defined in claim 27, wherein said elongate stiffener includes a front end portion, a roof portion, a rear end portion, and connecting portions between said roof portion and said front and rear end portions.

35. An automotive sheet body structure comprising:
- a side sheet member having an inner surface and an outer surface;
- an elongate stiffener secured to said inner surface of said side sheet member;
- said stiffener defining in cross-section a web and a flange extending outwardly from each end of said web, each of the flanges having a free edge; and
- a tubular bead extending along the free edge of at least one of said flanges for reinforcing said stiffener, said tubular bead being inturned and of an elliptical cross-section wherein the minor axis is at least about 40 percent of the major axis.

36. The automotive sheet body structure as defined in claim 35, wherein one of said flanges extends at right angles to said web to define a mounting flange, and the other of said flanges is a bowed flange.

37. The automotive sheet body structure as defined in claim 36, wherein said web has a width between two times and seven times the width of said bowed flange and the width of said mounting flange.

38. The automotive sheet body structure as defined in claim 34, wherein said tubular bead extends in a circular path of at least about 210 degrees.

39. An automotive sheet body structure as defined in claim 35, wherein said elongate stiffener extends continuously for substantially the entire length of said sheet body structure.

40. An automotive sheet body structure as defined in claim 35, wherein said elongate stiffener includes a front end portion, a roof portion, a rear end portion, and connecting portions between said roof portion and said front and rear end portions.

* * * * *